D. S. HARNER.
Harvester.
No. 71,164.
2 Sheets—Sheet 2.
Patented Nov. 19, 1867.
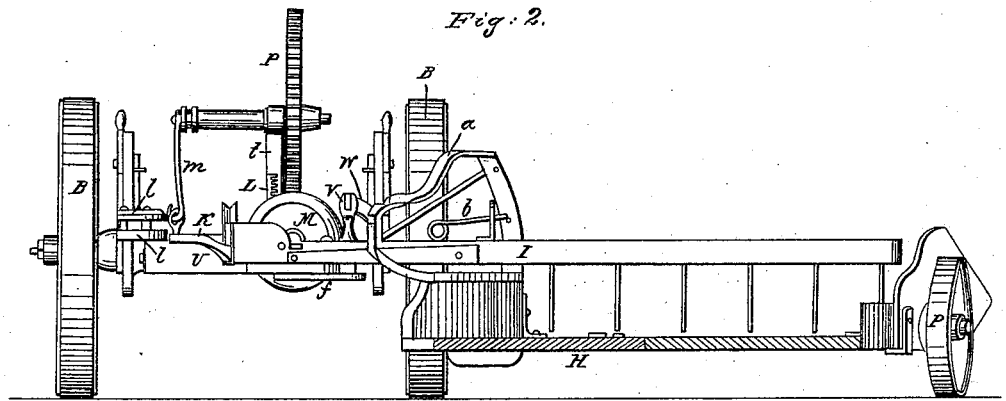
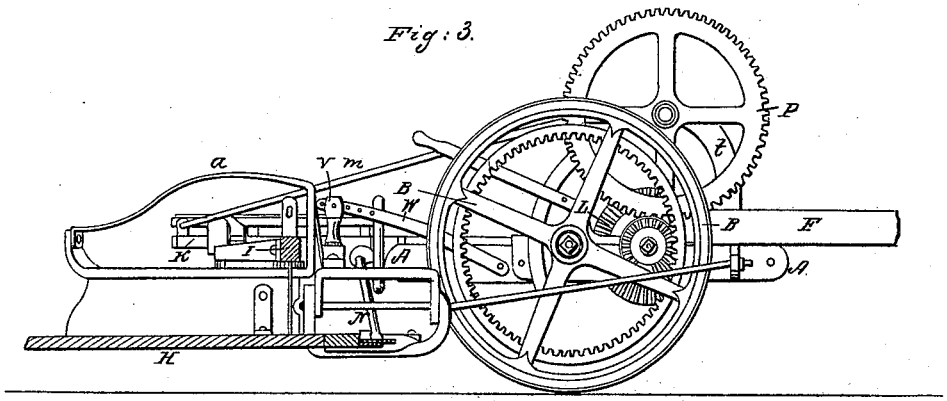

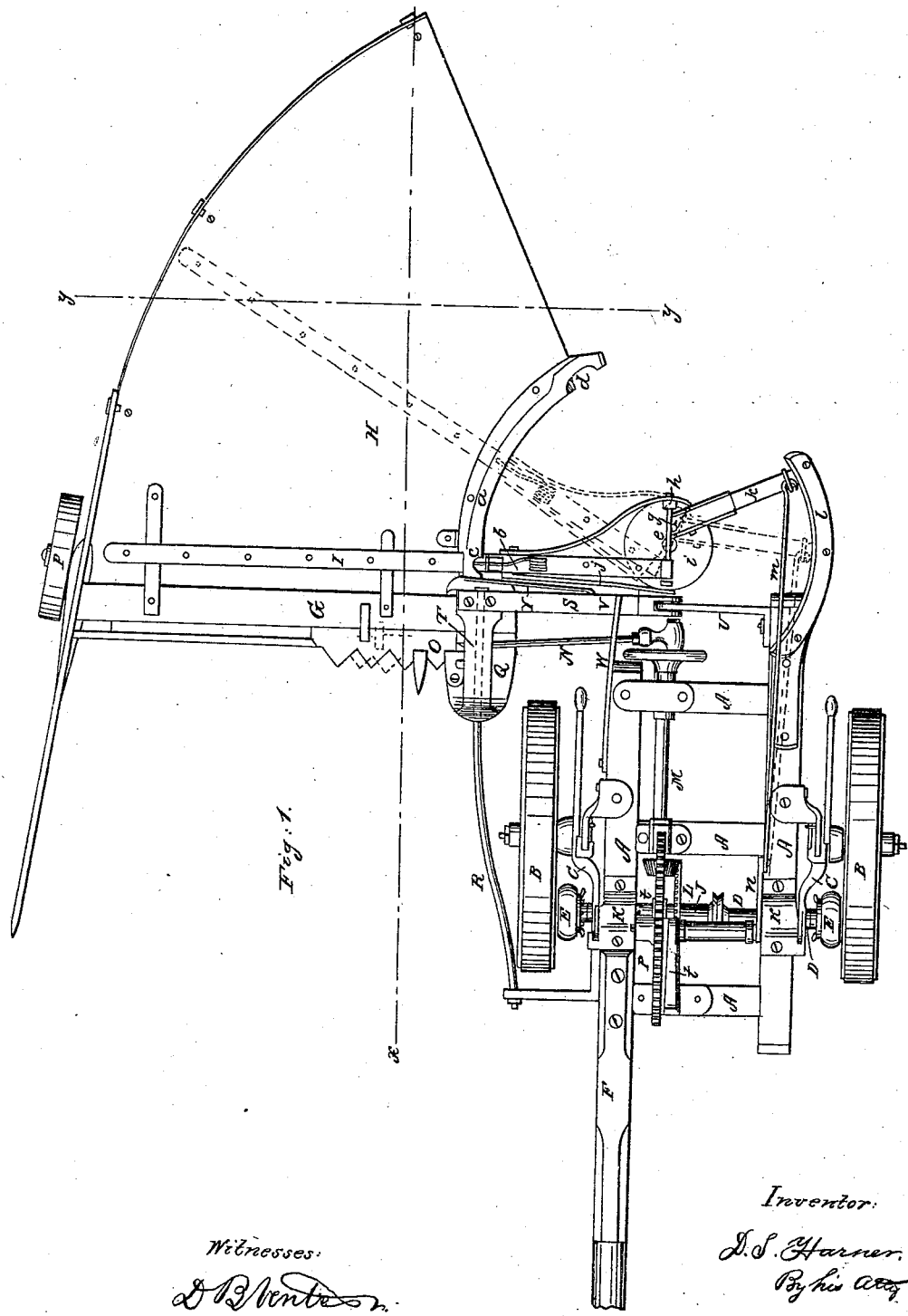

UNITED STATES PATENT OFFICE.

DAVID S. HARNER, OF XENIA, ASSIGNOR TO HIMSELF AND WHITELEY, FASSLER & KELLY, OF SPRINGFIELD, OHIO.

IMPROVEMENT IN HARVESTERS.

Specification forming part of Letters Patent No. 71,164, dated November 19, 1867.

*To all whom it may concern:*

Be it known that I, DAVID S. HARNER, of Xenia, in the county of Greene and State of Ohio, have invented a new and useful Improvement in Harvesters; and I do hereby declare the following to be a full, clear, and exact description of the same, reference being had to the accompanying drawings, in which—

Figure 1 is a plan view of my machine. Fig. 2 is a rear elevation of the same, the platform being in sectional elevation on line $y\ y$, Fig. 1; Fig. 3, an elevation of the outer side of the machine, the platform being in section on line $x\ x$ of Fig. 1.

This invention relates to that class of harvesting-machines known as "two-wheeled jointed-bar self-raking reaper and mower combined;" and it consists, first, in the manner of locating and connecting the rake with its driving mechanism, so that changes in the position of the main frame shall not affect the operation of the rake; second, in the manner of bracing the rake-head, so as to give the same a wide hinge-joint; third, in the manner of adjusting the position of the guard-fingers; fourth, in the construction of the latch.

That others may clearly understand the construction and operation of my machine, I will particularly describe it.

A A are the timbers forming the main frame, and B B are the driving and supporting wheels, whose axles are mounted upon coupling-arms C C, which move upon the pinion-shaft D as a center. Clutches E E serve to connect or disconnect the pinion-shaft from the pinions driven by the main wheels B, at any time, so that the cutting apparatus shall cease to operate, while the machine may continue in its onward movement. The tongue F is attached to the main frame by suitable bolts, as shown. G is the cutting apparatus, preferably of that kind known as having reciprocating scallop-cutters with open-slotted guard-fingers. H is a quadrant-shaped platform, upon which the cut grain is received, and I is the automatic sweep-rake, by which the cut grain is removed in suitable gavels and deposited at the side of the machine. J is the main pinion-shaft, having its bearing in the boxes K K on the main frame. The axis of this shaft forms the center around which the axes of the wheels B move as said wheels are raised or lowered in relation to the main frame. The bevel driving-wheel gear L upon said shaft drives the cutter-crank M, and N is the pitman which transmits motion to the cutter O. In the drawings the artist has not represented the entire cutting apparatus, but only so much of it as is necessary to exhibit its construction.

The platform H is secured to the finger-bar G in the usual manner, and has, at its outer end, a grain-wheel, P, to support said end at the desired height above the ground while reaping. When the machine is used for mowing, the platform and its attachments, together with the rake, are removed, and the cutting apparatus then slides upon the ground. The inner shoe Q of the cutting apparatus is constructed with its forward and rear ends turned upward, so as to permit the rear end of the drag-bar R to pass loosely through them, in such a manner as to form a pivot or center upon which the cutting apparatus may move, when either end rises or falls with the undulations of the ground.

The cutting apparatus is prevented from moving laterally in regard to the main frame by the coupling-arm S, which is joined at its outer end to the shoe Q, being bolted to a bridge-piece, T, through the ends of which the end of the drag-bar passes, as shown in Fig. 3. The inner end of the coupling-arm is pivoted to an arm or bracket, U, which is secured to and projects from some convenient part of the main frame, and so as to bring said joint in line with the axis of the crank-shaft M.

The movements of the cutting apparatus, in rising or falling with the undulations of the ground, will therefore not change the position of the stroke of the cutters over the guard-fingers. Upon the coupling-arm S is placed the stud V, which is slotted at its upper end, so as to admit the brace W to pass through it. This brace is secured at one end to the stud by a pin which passes through said stud, and through one of a series of holes through the brace, as shown in Fig. 3. The other end of said brace is secured to the main frame by a bolt. When it is required to change the angle of the guard-fingers, by raising or depressing their points, I do so, shifting the brace W backward or forward through the slot in the stud V, and also shifting the holding-pin to correspond. This method of adjustment is possible, because the parts in the joint between the coupling-arm S and bracket U are made of such shape as to permit a twist or roll in said joint to a limited extent, as shown in Fig. 4, and the curved drag-bar R, by partially rotating in its end bearings or joints, permits the front ends of the shoes and guard-fingers to be raised or lowered slightly, as may be desirable. The presence and arrangement of the brace W does not, in practice, obstruct the free motions of the shoe Q at the inner end of the cutting apparatus, in rising or falling with the undulations of the ground.

When this machine is used for reaping, the inner end of the cutting apparatus must be sustained at a distance above the ground equal to the height of the outer end, while at the same time said cutting apparatus may be free to rise or fall independent of the main frame. To accomplish this purpose it is only necessary to render the joint rigid at one or the other end of the coupling-arm S, and this I prefer to do by means of the adjustable brace Y, which is pivoted at one end to the coupling-arm S, and at the other end is secured to the front portion of the rake-arch $a$, as clearly shown in the figures. This renders the joint at the shoe rigid, and the brace Y may be adjusted to suit different heights of the cutting apparatus by securing it in different holes in the coupling-arm or rake-arch.

The rake-arch $a$ is in the form clearly shown in the drawings. Its construction and operation are well understood. The latch $b$ is constructed of a single piece, and in that particular differs from any hitherto in use. It is formed of a rod of spring-steel, of proper size, one portion being coiled several times, as shown, so as to give the requisite amount of elasticity, and one end is securely fastened to the top of the rake-head I, while the other end projects in a line parallel with the upper surface of the same, and in such a position as will render it certain to pass through the notches $c$ and $d$, and ride upon the arch $a$ in the forward stroke of the rake.

The rake rises and falls upon a joint-bolt, $g$, which passes through the end of the rake-head, and through two lugs, $h\ h$, upon the plate I and the braces $j\ j$. These braces are secured at one end to each side of the rake-head, and pivoted at the other to the extremities of the bolt $g$, so as to give a wide bearing for the joint of the rake, and obviate liability to derangement by the side strain during operation.

The plate $i$ is pivoted at $e$ to the arm or bracket $f$, which is secured to and moves with the coupling-arm S, and around this center the rake moves in removing the grain from the platform and returning for a fresh stroke. The center $e$ is, as nearly as possible, in line with the axis of the crank-shaft M and inner joint of the coupling-arm, so that the movements of the main frame and cutting apparatus, in relation to each other, will not affect the operation of the rake. The rake-head is placed upon the joint-bolt $g$, not over the center $e$, but as near to that lug, $h$, which is toward the main frame as possible, as shown in Fig. 1, and this arrangement has the effect of somewhat shortening the sweep of the rake, so that a shorter platform may be used than would otherwise be feasible.

The lever $k$ is pivoted to the plate $i$, and its free end moves between the guide-arcs $l\ l$, which are secured to the rear end of the main frame, and extend backward therefrom for that purpose. I employ this arrangement to give uniform motion to the rake, without any derangement on account of changes in the relative positions of the rake and its driving mechanism. The free end of the lever $k$ moves in a constant arc, in relation to the main frame, while it is also always connected to the plate $g$. The pitman $m$ connects the free end of the lever $k$ with the crank $n$ upon the shaft of the gear-wheel $p$, which in turn receives motion from the pinion $r$ upon the main pinion-shaft J.

The shaft of the gear-wheel $p$ is mounted in a box upon the upper end of a standard, $t$, which is bolted to the front part of the main frame, and between the driving-wheels B, so that the mechanism which drives the rake may be located at a distance from the standing grain, and in a position upon the main frame where the most efficient operation and least liability of derangement may be secured.

No reel or seat for the driver is shown, as neither forms any part of my invention as herein set forth. They both, however, are used in actual practice, and may be disposed as deemed desirable, there being ample space for them.

Having described my invention, what I claim as new, and desire to secure by Letters Patent, is—

1. The combination of the lever $k$ and rake-head I, when said lever and rake-head are both pivoted to the plate $i$, or its equivalent, and are capable of independent vertical movements, substantially as and for the purpose set forth.

2. The combination of the pitman $m$, pivoted lever $k$, and curved guides $l\ l$, as and for the purpose set forth.

3. The braces $j\ j$, arranged on either side of the rake-head I, as shown, so as to prevent any lateral movement of said rake-head upon its bearing on the joint-bolt $g$.

4. The rake-head I, moving upon a pin, $e$, which is about in line with the axis of the crank-shaft; said rake-head is between said pin and the main frame, as set forth.

5. The adjusting-bar W, connected to the main frame and coupling-arm, or its equivalent, for the purpose of adjusting the angle of the cutters and the position of cutter-bar and platform.

6. The following instrumentalities, combined and arranged substantially as set forth, in a harvesting-machine having a floating platform and two driving-wheels, to wit: the sweep-rake I, pivoted lever k, pitman m, crank n, and geared wheel p, meshing with a driving-pinion on the main pinion-shaft between the two driving-wheels.

7. The spring-latch b, constructed so that the latch and spring are formed of one piece, in combination with the rake-head I and arch a, substantially as and for the purpose set forth.

8. The combination of the pivoted arm k, plate i, and guides l l, connecting-rod m, and crank n, or their equivalents, so that the mechanism which drives the rake shall be connected thereto outside of the center upon which said rake moves, substantially as shown.

9. The arrangement of the rake-head I in relation to its center-pin e, to wit—on that side of said center-pin which is toward the main frame and cutting apparatus, so as to reduce the necessary length of the platform, as set forth.

10. The loose or rolling joint between the coupling-arm S and bracket U, (shown in Figs. 1 and 4,) in connection with the curved drag-bar R, as and for the purpose set forth.

DAVID S. HARNER.

Witnesses:
GEO. W. BURNS,
Y. J. PRINGLE.